United States Patent
Scheich et al.

(10) Patent No.: US 12,247,656 B1
(45) Date of Patent: Mar. 11, 2025

(54) TORQUE CONVERTER PROTECTIVE ACTIONS FOR HIGH SEVERITY CUSTOMERS

(71) Applicant: GM Global Technology Operations LLC, Detroit, MI (US)

(72) Inventors: Andrew R. Scheich, White Lake, MI (US); Daniel P. Laurent, Saline, MI (US); Peter Paul Radecki, White Lake, MI (US); Roberto Diaz, El Paso, TX (US); Shawn B. Look, Walled Lake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 18/450,062

(22) Filed: Aug. 15, 2023

(51) Int. Cl.
*F16H 61/12* (2010.01)
*F02D 41/02* (2006.01)
(Continued)

(52) U.S. Cl.
CPC ......... *F16H 61/12* (2013.01); *F02D 41/0215* (2013.01); *F16H 45/02* (2013.01); *F16H 57/048* (2013.01); *F16H 59/68* (2013.01); *F16H 61/14* (2013.01); *G07C 5/0808* (2013.01); *G07C 5/0825* (2013.01); *F02D 2200/50* (2013.01); *F16H 2061/1232* (2013.01); *F16H 2061/1256* (2013.01)

(58) Field of Classification Search
CPC .......... F16H 61/12; F16H 61/14; F16H 45/02; F16H 57/048; F16H 59/68; F16H 2061/1232; F16H 2061/1256; F02D 41/0215; F02D 2200/50

See application file for complete search history.

(56) References Cited

U.S. PATENT DOCUMENTS 7,806,803 B2 * 10/2010 Shultz .................... F16H 61/16
477/76
2012/0245812 A1 * 9/2012 Anderson ........... F16H 61/0213
701/60

(Continued)

*Primary Examiner* — Edwin A Young
(74) *Attorney, Agent, or Firm* — Honigman LLP; Matthew H. Szalach; Jonathan P. O'Brien

(57) ABSTRACT

A torque converter management system includes a torque converter having a clutch and a torus. The torque converter management system includes memory hardware that stores instructions, that, when executed on data processing hardware of the system, cause the system to perform operations for protecting the torque converter. The operations include receiving torque converter temperature associated with the torque converter. The operations further include obtaining a torque converter protection schedule including one or more torque converter protective action initiation threshold temperatures each having an associated torque converter protective action and determining whether the torque converter temperature(s) exceeds a first one of the torque converter protective action initiation threshold temperatures. When the first torque converter temperature exceeds the first one of the torque converter protective action initiation threshold temperatures, the system initiates a first torque converter protective action associated with the exceeded first torque converter protective action initiation threshold temperature.

18 Claims, 6 Drawing Sheets

(51) Int. Cl.
  *F16H 45/02* (2006.01)
  *F16H 57/04* (2010.01)
  *F16H 59/68* (2006.01)
  *F16H 61/14* (2006.01)
  *G07C 5/08* (2006.01)

(56) References Cited

U.S. PATENT DOCUMENTS

2019/0338850 A1* 11/2019 Moorman ............... F16H 59/46
2020/0072331 A1*  3/2020 Ubelhart ............... F16H 61/143

* cited by examiner

TORQUE CONVERTER PROTECTIVE ACTIONS FOR HIGH SEVERITY CUSTOMERS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against present disclosure.

The present disclosure relates generally to torque converter protective actions for high-severity customers. A torque converter is a fluid-coupling device that provides smooth transition of engine power to a transmission. A stator located in the torque converter multiplies torque by altering the direction of oil flow between a pump and a turbine. This change in direction increases the inertial fluid force on the pump assembly, thereby increasing turbine torque. Because the stator reroutes the fluid and is located in the center of the fluid coupling flow; the stator receives a high amount of thermal energy. Additionally modern torque converters incorporate a clutch to increase efficiency. Under some conditions this clutch has intentional microslip to attenuate engine vibrations and prevent harsh engagements and disengagements between the engine and transmission. In combination with a higher transmission fluid sump temperature for improved fuel economy, this microslip can lead to the clutch interface operating at higher temperatures than intended by design.

SUMMARY

An aspect of the disclosure provides computer-implemented method that, when executed by data processing hardware of a vehicle having a torque converter, causes the data processing hardware to perform operations. The operations include receiving torque converter temperature associated with the torque converter. The operations further include obtaining a torque converter protection schedule including one or more torque converter protective action initiation threshold temperatures each having an associated torque converter protective action. The operations further include determining whether the torque converter temperature exceeds a first torque converter protective action initiation threshold temperature. The operations also include, when the torque converter temperature exceeds the first torque converter protective action initiation threshold temperature, initiating a first torque converter protective action associated with the exceeded first torque converter protective action initiation threshold temperature.

This aspect of the disclosure may include one or more of the following optional features. In some examples, the operations further include determining whether the torque converter temperature exceeds a second one of the torque converter protective action initiation threshold temperatures, and when the torque converter temperature exceeds the second one of the torque converter protective action initiation threshold temperatures, requesting a second torque converter protective action different than the first torque converter protective action.

In some examples, the first torque converter protective action includes at least one of (i) requesting increased cooling of the torque converter, (ii) adjustment of a clutch application pressure of a clutch of the torque converter, (iii) instructing an internal combustion engine of the vehicle to suspend a cylinder deactivation mode, (iv) instructing a transmission of the vehicle to operate in a different mode, (v) displaying a notification to a vehicle operator, (vi) releasing the clutch of the torque converter, or (vii) terminating a current clutch slip profile. In some implementations, the second torque converter protective action includes another of (i) requesting increased cooling rate of the torque converter, (ii) adjustment of the clutch application pressure of a clutch of the torque converter, (iii) instructing the internal combustion engine of the vehicle to suspend a cylinder deactivation mode, (iv) instructing the transmission of the vehicle to operate in a different mode, (v) displaying a notification to the vehicle operator, (vi) releasing the clutch of the torque converter, or (vii) terminating a current clutch slip profile.

In some configurations, the operations include determining the torque converter temperature based on at least one of a measured torque converter temperature or a modeled torque converter temperature. In some examples, the torque converter temperature is a clutch temperature. In some configurations, the torque converter temperature is a torus temperature.

Another aspect of the disclosure provides a system having a torque converter including a clutch and a torus, data processing hardware, and memory hardware in communication with the data processing hardware, the memory hardware storing instructions that when executed on the data processing hardware cause the data processing hardware to perform operations. The operations include receiving a torque converter temperature associated with the torque converter. The operations further include obtaining a torque converter protection schedule including one or more torque converter protective action initiation threshold temperatures each having an associated torque converter protective action. The operations further include determining whether the torque converter temperature exceeds a first torque converter protective action initiation threshold temperature. The operations further include when the torque converter temperature exceeds the first torque converter protective action initiation threshold temperature, initiating a first torque converter protective action associated with the exceeded first torque converter protective action initiation threshold temperature.

This aspect of the disclosure may include one or more optional features. In some examples, the operations include determining whether the torque converter temperature exceeds a second one of the torque converter protective action initiation threshold temperatures, and when the torque converter temperature exceeds the second one of the torque converter protective action initiation threshold temperatures, requesting a second torque converter protective action different than the first torque converter protective action.

In some examples, the first torque converter protective action includes at least one of (i) requesting an increased cooling rate of the torque converter, (ii) adjustment of a clutch application pressure of a clutch of the torque converter, (iii) instructing an internal combustion engine of a vehicle to suspend a cylinder deactivation mode, (iv) instructing a transmission of the vehicle to operate in a different mode, (v) displaying a notification to a vehicle operator, (vi) releasing the clutch of the torque converter, or (vii) terminating a current clutch slip profile. In some implementations, the second torque converter protective action includes another of (i) requesting an increased cooling rate of the torque converter, (ii) adjustment of the clutch application pressure of a clutch of the torque converter, (iii)

instructing the internal combustion engine of the vehicle to suspend a cylinder deactivation mode, (iv) instructing the transmission of the vehicle to operate in a different mode, (v) displaying a notification to the vehicle operator, (vi) releasing the clutch of the torque converter, or (vii) terminating a current clutch slip profile.

In some examples, the operations include determining the torque converter temperature based on at least one of a measured torque converter temperature and a modeled torque converter temperature. In some configurations, the torque converter temperature is a clutch temperature. In some implementations, the torque converter temperature is a torus temperature.

Another aspect of the disclosure includes a computer program product encoded on a non-transitory computer readable storage medium comprising instructions, that, when executed by a data processing apparatus cause the data processing apparatus to perform operations. The operations include receiving a torque converter temperature associated with the torque converter. The operations further include obtaining a torque converter protection schedule including one or more torque converter protective action initiation threshold temperatures each having an associated torque converter protective action. The operations further include determining whether the torque converter temperature exceeds a first torque converter protective action initiation threshold temperature. The operations further include, when the torque converter temperature exceeds the first torque converter protective action initiation threshold temperature, initiating a first torque converter protective action associated with the exceeded first torque converter protective action initiation threshold temperature.

This aspect of the disclosure may include one or more of the following optional features. In some examples, the operations include determining whether the torque converter temperature exceeds a second one of the torque converter protective action initiation threshold temperatures, and when the torque converter temperature exceeds the second one of the torque converter protective action initiation threshold temperatures, requesting a second torque converter protective action different than the first torque converter protective action.

In some configurations, the first torque converter protective action includes at least one of (i) requesting an increased cooling rate of the torque converter, (ii) adjustment of a clutch application pressure of a clutch of the torque converter, (iii) instructing an internal combustion engine of a vehicle to suspend a cylinder deactivation mode, (iv) instructing a transmission of a vehicle to operate in a different mode, (v) displaying a notification to a vehicle operator, (vi) releasing the clutch of the torque converter, or (vii) terminating a current clutch slip profile. In some implementations, the second torque converter protective action includes another of (i) requesting an increased cooling rate of the torque converter, (ii) adjustment of the clutch application pressure of a clutch of the torque converter, (iii) instructing the internal combustion engine of the vehicle to suspend a cylinder deactivation mode, (iv) instructing the transmission of the vehicle to operate in a different mode, (v) displaying a notification to the vehicle operator, (vi) releasing the clutch of the torque converter, or (vii) terminating a current clutch slip profile.

In some examples, the operations include determining the torque converter temperature based on at least one of a measured torque converter temperature or a modeled torque converter temperature. In some implementations, the torque converter temperature is at least one of a clutch temperature or a torus temperature.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
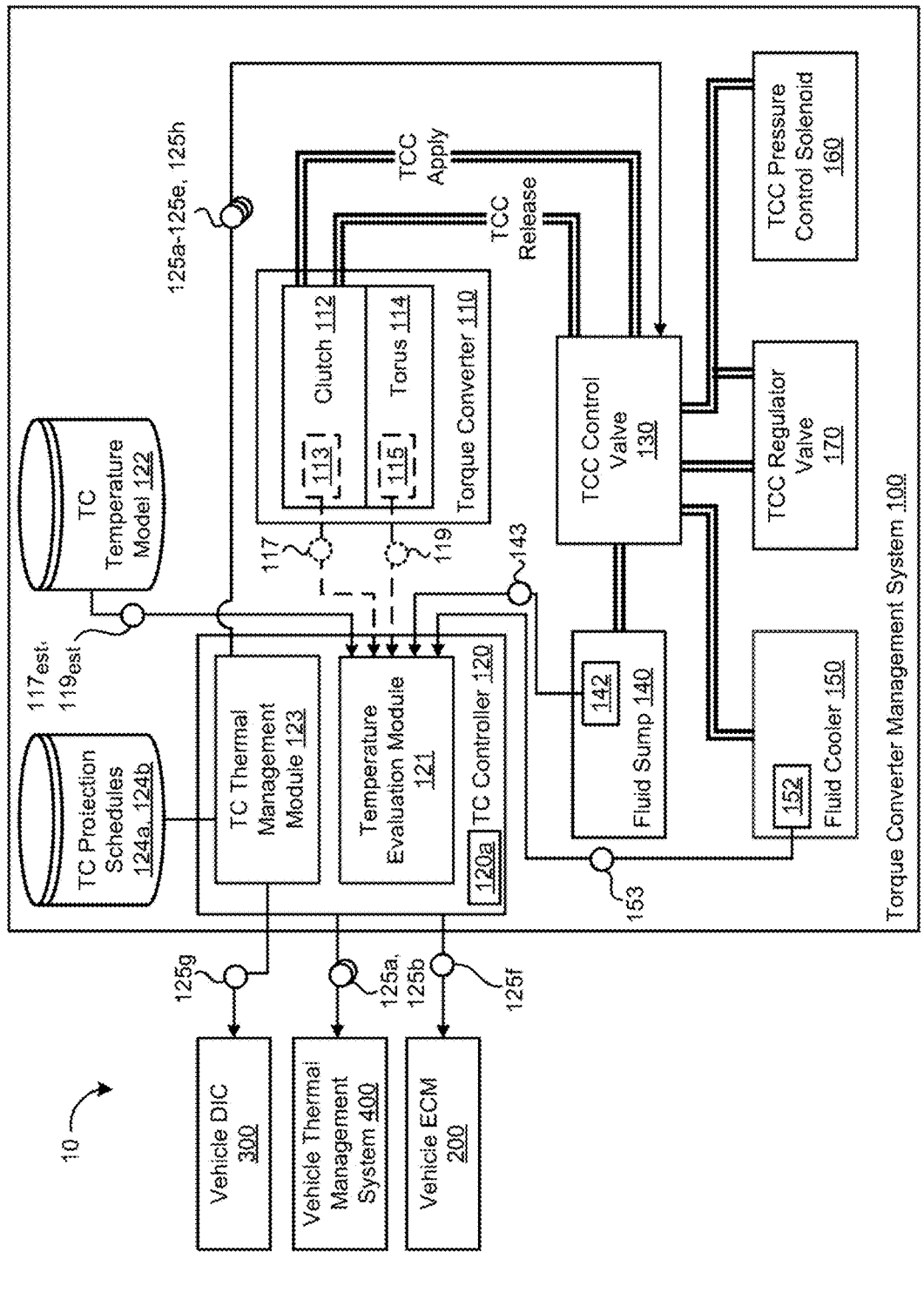
FIG. 1 is a schematic diagram of a vehicle including a torque converter management system in accordance with the principles of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a." "an," and "the" may be intended to include the plural forms as well, unless the context clearly indicates otherwise. The terms "comprises," "comprising." "including." and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to." "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term module may be replaced with the term circuit. The term module may refer to, be part of, or include an Application Specific Integrated Circuit (ASIC): a digital, analog, or mixed analog/digital discrete circuit: a digital, analog, or mixed analog/digital integrated circuit: a combinational logic circuit: a field programmable gate array (FPGA): a processor (shared, dedicated, or group) that executes code; memory (shared, dedicated, or group) that stores code executed by a processor: other suitable hardware components that provide the described functionality: or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry. e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices: magnetic disks, e.g., internal hard disks or removable disks: magneto optical disks: and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well: for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user: for example, by sending web pages to a web browser on a user's client device in response to requests received from the web browser.

The present disclosure relates to a system and method for providing torque converter protection for high-severity duty cycle applications, whereby the system and method minimizes operation of a torque converter outside of operation thresholds through the use of a synthetic temperature estimation and/or physical measurement of the clutch and fluid temperature inside of the torque converter. This additional method for providing cooling to the torque converter provides a way to ensure the torque converter is operating within preferred ranges. The cooling actions of the present disclosure are designed in such a way that, as the estimated temperature increases, so does the level of the cooling actions. Additionally, the present disclosure provides for threshold temperatures at which cooling actions are initiated to be calibrated based on application, which allows the system to be tuned to properly initiate cooling actions during normal driving.

Referring to FIG. 1, pertinent subsystems of a vehicle 10 are provided schematically. Particularly, a representative example of the vehicle 10 includes a torque converter management system 100 in accordance with an implementation of the present disclosure. Additionally, the vehicle 10 includes one or more peripheral vehicle control modules that are pertinent to the torque converter management system 100. Particularly, the vehicle 10 is shown with a vehicle engine control module (ECM) 200, a vehicle driver information console (DIC) 300, and a vehicle thermal management system 400.

With continued reference to FIG. 1, the torque converter management system 100 includes a torque converter 110 having a torus 114 and a clutch 112, a torque converter controller 120, a torque converter clutch control valve 130, a fluid sump 140, a fluid cooler 150, a torque converter clutch pressure control solenoid 160, and a torque converter clutch regulator valve 170, as respectively described in greater detail below: Generally, the torque converter management system 100 is operable to manage operation of the torque converter 110 and/or one of the vehicle subsystems 200, 300, 400 based on a temperature of the torque converter 110. For example, the torque converter management system 100 may generate instructions for one or more protective actions to address high-temperature conditions of the torque converter 110 when a temperature of the torque converter 110 exceeds a corresponding torque converter threshold temperature.

Figure 2A:
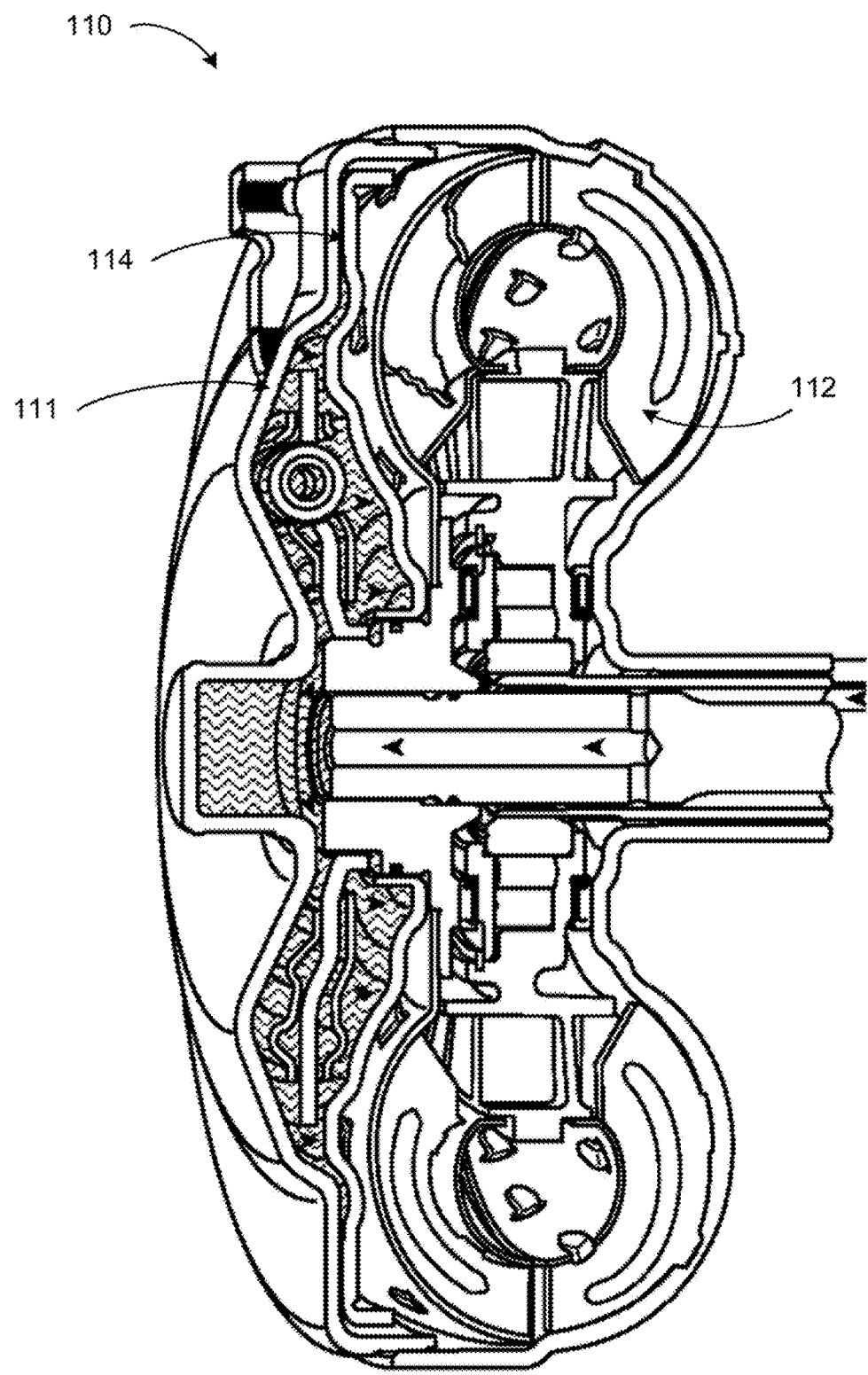
FIG. 2A shows an example of a torque converter with a clutch in a disengaged state.
Figure 2B:
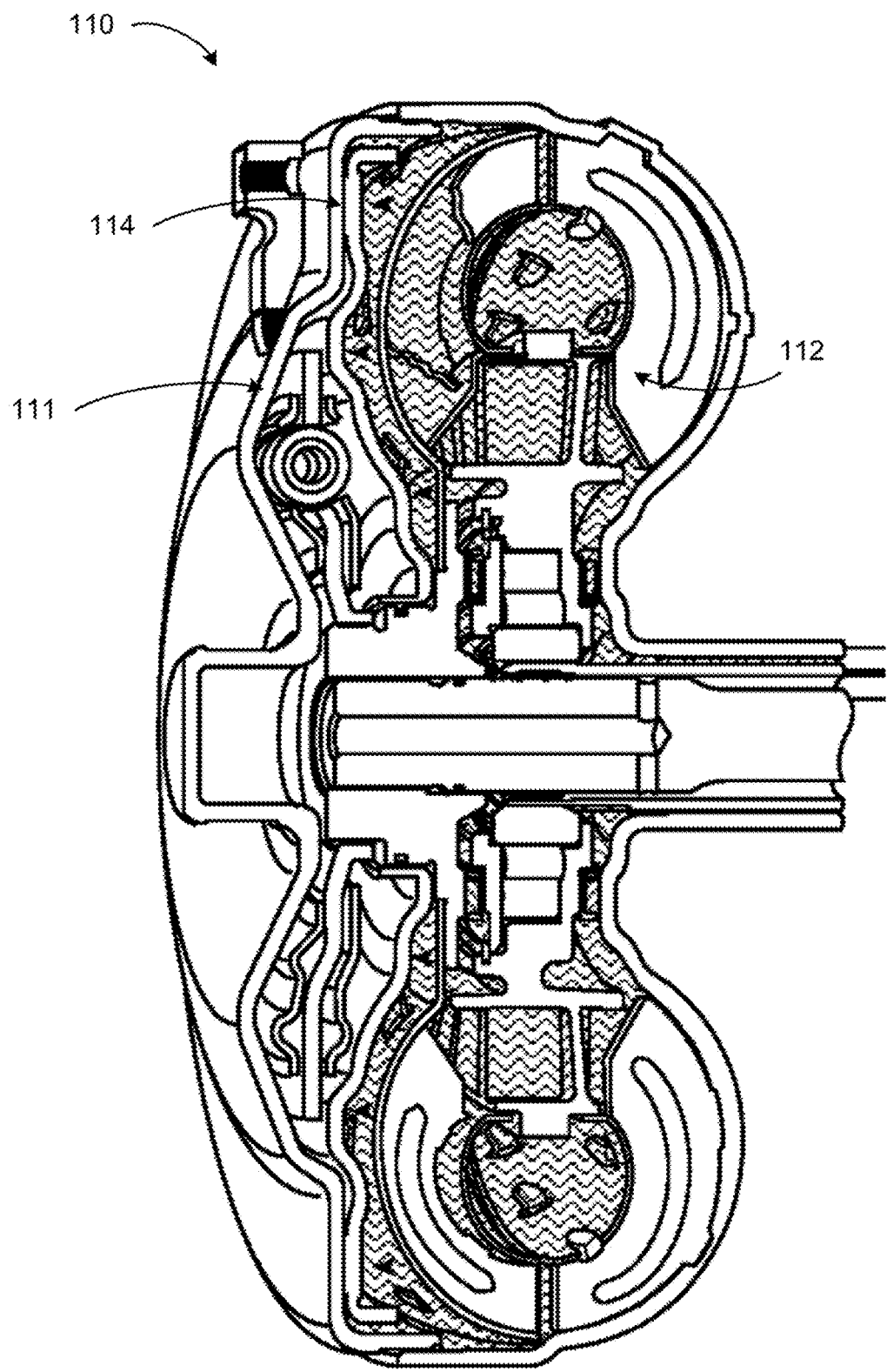
FIG. 2B shows the torque converter of FIG. 2A with the clutch in an engaged state.

While the torque converter 110 is shown as a simplified schematic for the sake of this disclosure, an example of a torque converter 110 is shown in FIGS. 2A and 2B including the torus 114 and the clutch 112. It should be understood that the torque converter 110 will include an input shell 111 which has secured thereto, a drive lug adapted to be connected to an internal combustion engine (not shown). The torus 114 of the torque converter 110 further includes an impeller, a turbine, and a stator, where the impeller is welded or otherwise secured to the input shell 111 and the turbine is welded or otherwise secured to a torque converter output shaft. The stator is connected through a one-way drive device to a stationary portion of a vehicle transmission. The impeller, turbine, and stator are hydrodynamic drive members, which provide a fluid drive within the torus. In fluid drives, such as the torque converter 110, hydraulic fluid is circulated in the torus 114 formed by the impeller, turbine, and stator. A friction clutch assembly 114 is disposed between the input shell 111 and the torus 114. In the illustrated example, the clutch 112 includes a pressure plate and a friction facing bonded to the pressure plate, whereby the friction facing is adapted, during clutch engagement, to frictionally engage the input shell 111, such that the pressure plate and input shell 111 rotate in unison. However, other examples of the disclosure may be implemented in connection with a dual plate torque converter including a floater plate disposed between the pressure plate and the input shell 111. FIG. 2A shows the torque converter 110 with the clutch 112 in a disengaged state (i.e., fluid pressure applied at a left side of the clutch 112 to bias the clutch 112 away from the input shell 111) and FIG. 2B shows the torque converter with the clutch 112 in an engaged state (e.g., fluid pressure applied at a right side of the clutch 112 to bias the clutch 112 against the input shell 111). While one example of a torque converter 110 is described here for illustration, the principles of the present disclosure may apply to any torque converter 110 including a friction clutch assembly in combination with a torus.

In the illustrated example, the torque converter management system 100 includes a plurality of temperature measurement units, such as temperature sensors. For example, the torque converter management system 100 may include a clutch temperature sensor (e.g., thermocouple, thermistor) 113 configured to measure a clutch temperature 117, a torus temperature sensor 115 configured to measure a torus temperature 119, a sump temperature sensor 142 configured to measure a sump temperature 143, and/or a fluid cooler temperature sensor 152 configured to measure a fluid cooler temperature 153. It should be appreciated that the torque converter management system 100 may include any combination of the temperature sensors 113, 115, 142, 152. Particularly, the torque converter management system 100 may be provided without the torus temperature sensor 115 and/or the clutch temperature sensor 113 (as signified by the dashed lines). For example, because of the rotational nature of the torus 114 and the clutch 112, it may be impractical to incorporate wired temperature sensors into the torque converter 110. Conversely, while wireless temperature sensors may be utilized to directly measure temperatures of the torus 114 and the clutch 112, such systems are relatively expensive and may be cost-prohibitive in a mass-production environment. Accordingly, as discussed in greater detail below, it is advantageous to determine the temperatures 117, 119 of the torque converter 110 without the need for direct measurement (i.e., temperature sensors).

Referring still to FIG. 1, the torque converter controller 120 includes a temperature evaluation module 121 and a torque converter thermal management module 123. The torque converter controller 120 (e.g., data processing hardware) may include or communicate with memory hardware configured to, inter alia, store instructions (e.g., computer-readable program instructions), that when executed by the torque converter controller 120, cause the torque converter controller 120 to perform numerous operations described herein. In the illustrated example, the torque converter controller 120 is embodied as a standalone controller within the torque converter management system 100. However, it should be understand that the torque converter controller 120 may be implemented or embodied within other controllers of the vehicle, such as the engine control module 200 and/or a transmission control module (TCM). Generally, the temperature evaluation module 121 is configured to obtain or determine temperatures 117, 119 associated with the torque converter 110 and to communicate those torque converter temperatures 117, 119 to the torque converter thermal management module 123, which, in turn, evaluates the torque converter temperatures 117, 119 and determines whether to initiate one or more torque converter protective actions.

While the temperature evaluation module 121 may be able to obtain torque converter temperatures 117, 119 directly from the torque converter 110, as discussed previously, the temperature evaluation module 121 of the present disclosure is configured to determine an estimated torque converter temperature $117_{est}$, $119_{est}$ based on modeled vehicle operating parameters. For example, the torque converter management system 100 may include or look-up a torque converter temperature model 122 built based on particular parameters of the torque converter 110 and the vehicle 10. For example, the estimated torus temperature $119_{est}$ and the estimated clutch temperature $117_{est}$ may be modeled as functions of a combination of various torque converter operating parameters, including one or more of: (i) a calculated clutch power, (ii) an estimated clutch pressure. (iii) a measured engine speed. (iv) measured transmission input speed. (v) an operating mode (e.g., high-slip, low-slip, locked) of the torque converter clutch 112. (vi) a commanded hydraulic line pressure. (vii) a calculated torus power. (viii) a measured sump temperature 143 of the fluid sump 140. (ix) a temperature model reset at key-on, (x) engine-off time. (xi) an auto stop definition, and/or (xii) a key-off/stall definition. (xiii) stored last key-off estimated model temperature. Additionally, the estimated torus temperature $119_{est}$ and the estimated clutch temperature $117_{est}$ may be modeled to account for physical properties of the torque converter 110, such as mass, shape, size, thermal conductivity, and heat capacity. The estimated torus temperature $119_{est}$ and the estimated clutch temperature $117_{est}$ may also account for estimated operating parameters, such as transmission fluid flow rates, coolant flow rates, and ambient air convection.

The torque converter temperature model 122 may be generated for a specific torque converter management system 100 to account for particular performance properties associated with the design of the torque converter 110 and peripheral components 130, 140, 150, 170, 160. In some examples, the torque converter temperature model 122 may be built and calibrated for a specific configuration of a torque converter management system 100 through derivation or sampling, whereby the torque converter management system 100 is operated in a model development phase across a range of each of the aforementioned torque converter operating parameters and corresponding torque converter temperatures 117, 119 are measured in the model development phase. This may be accomplished using a development torque converter management system 100 including the torus temperature sensor 115 and the clutch temperature sensor 113. The resulting torque converter temperature model 122 is then stored for use in the production torque converter management system 100 that does not include the temperature sensors 113, 115. In the production torque converter management system 100, the temperature evaluation module 121 receives real-time torque converter operating parameters and performs a look-up function to retrieve the estimated torus temperature $119_{est}$ and the estimated clutch temperature $117_{est}$ from the torque converter temperature model 122.

In use, the torque converter thermal management module 123 utilizes the estimated torus temperature $119_{est}$ and/or the estimated clutch temperature $117_{est}$ to request and initiate one or more protective actions 125a-125h based on a torque converter protection schedule 124a, 124b. Generally, the torque converter temperature evaluation module 121 determines the estimated torus temperature $119_{est}$ and/or the estimated clutch temperature $117_{est}$ based on the torque converter temperature model 122 for the torque converter management system 100. The torque converter thermal management module 123 obtains the estimated torus temperature $119_{est}$ and/or the estimated clutch temperature $117_{est}$ and determines whether the torque converter management system 100 needs to initiate one or more protective actions 125a-125h based on the torque converter protection schedules 124a, 124b.

Figure 4:
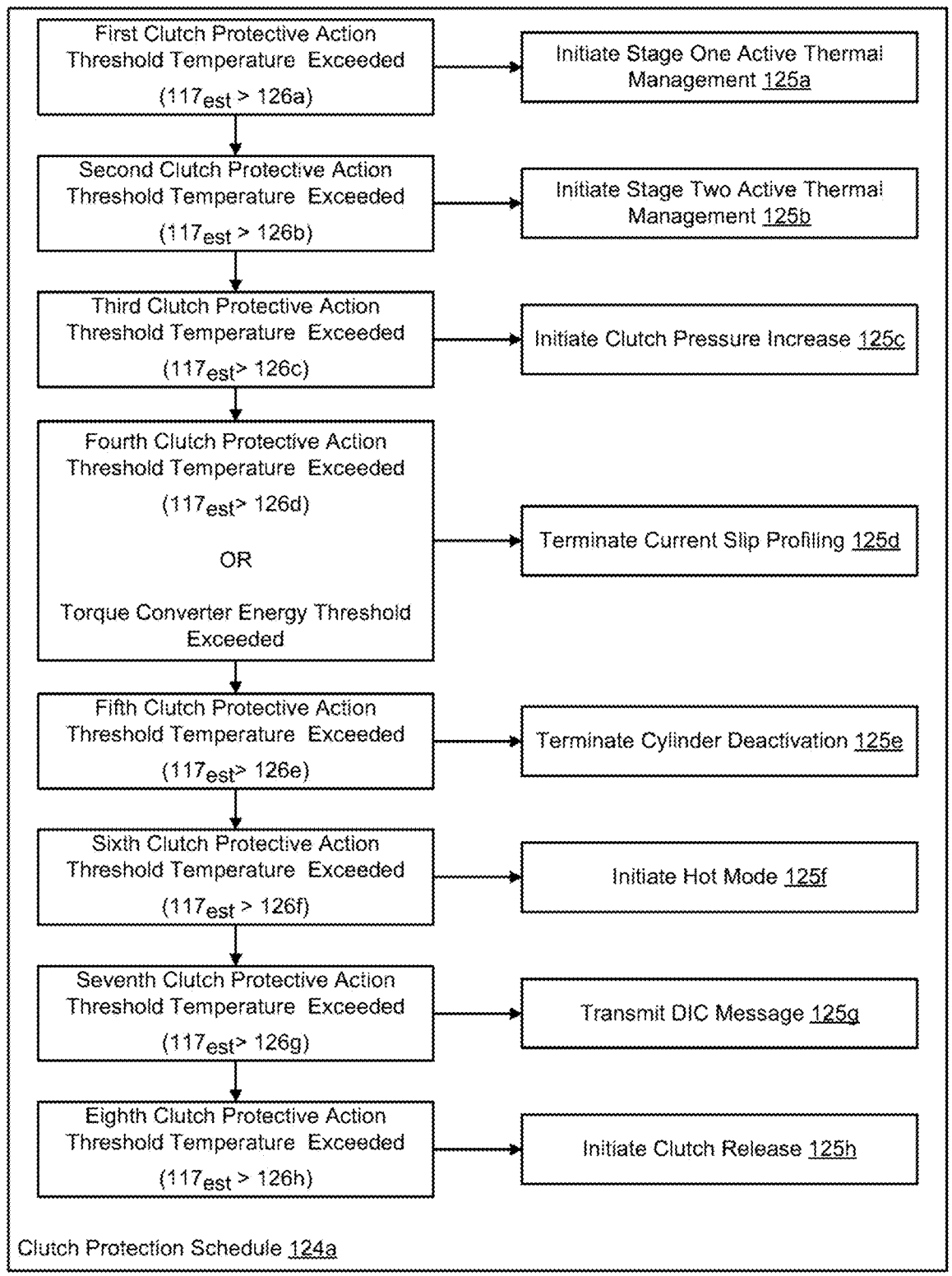
FIG. 4 is clutch protection schedule including torque converter protective actions implemented using the torque converter management system of FIG. 1.
Figure 5:
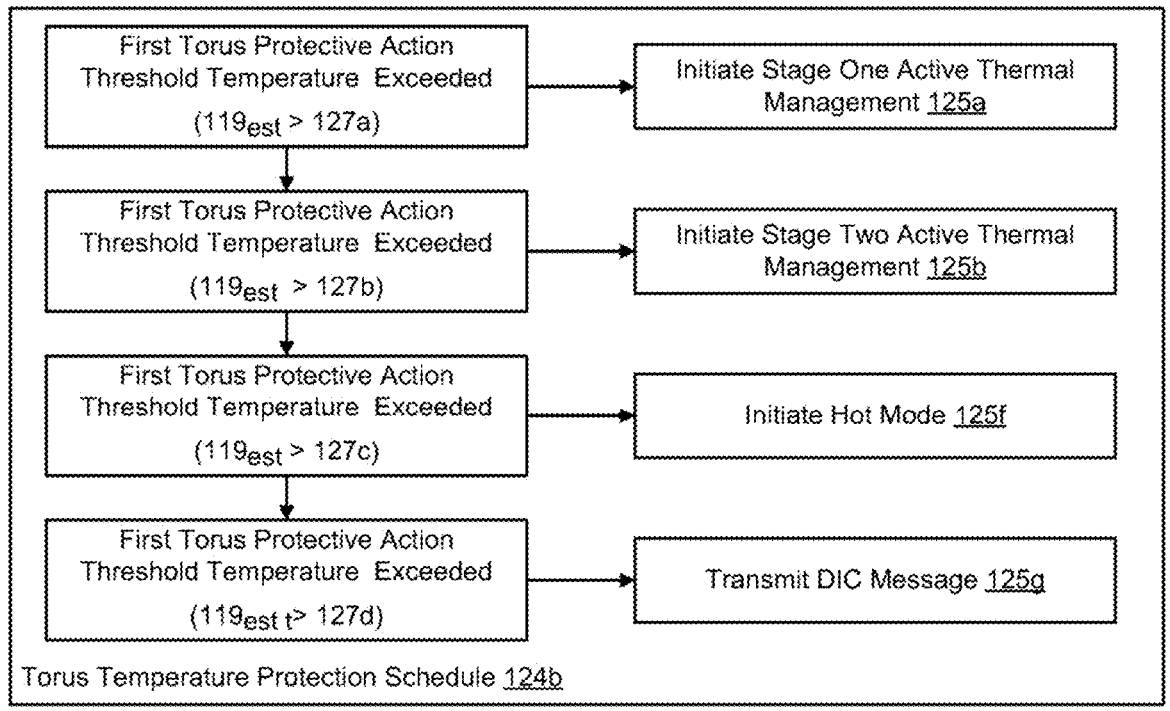
FIG. 5 is a torus protection schedule including torque converter protective actions implemented using the torque converter management system of FIG. 1.

The torque converter protection schedules 124a, 124b include a clutch protection schedule 124a including one or more torque converter protective actions 125a-125h (FIG. 4) and a torus protection schedule 124b including one or more of the torque converter protective actions 125a, 125b, 125f, 125g (FIG. 5). Initiation of each of the clutch protective actions 125a-125h is associated with a corresponding threshold or trigger temperature 126a-126h, whereby the torque converter thermal management module 123 initiates a respective one of the clutch protective actions 125a-125h when the estimated clutch temperature $117_{est}$ exceeds the corresponding protective action initiation threshold temperature 126a-126h. Initiation of each of the torus protective actions 125a. 125b, 125f, 125g is associated with a corresponding threshold or trigger temperature 127a-127d, whereby the torque converter thermal management module 123 initiates a respective one of the protective actions 125a, 125b, 125f, 125g when the estimated torus temperature $119_{est}$ exceeds the corresponding protective action initiation threshold temperature 127a-127d. The protective action initiation threshold temperatures 126a-126h, 127a-127d of each of the torque converter protection schedules 124a, 124b are calibrated based on the specific configuration and desired operating characteristics of the torque converter 110. In operation, the torque converter management system 100 may simultaneously utilize both of the torque converter protection schedules 124a, 124b based on the estimated clutch temperature $117_{est}$ and the estimated torus temperature $119_{est}$ at any given time.

In some examples, the torque converter protection schedules 124a. 124b may apply a threshold temperature time period for each protective action initiation threshold temperature 126a-126h, 127a-127d. For example, the torque converter thermal management module 123 will not initiate a protective action 125a-125h unless the protective action initiation threshold temperature 126a-126h, 127a-127d is exceeded for at least a specified period of time. The threshold temperature time period may be a continuous period (e.g., ten (10) consecutive seconds) or an aggregate period (e.g., ten (10) seconds total within a twenty (20) continuous second period). Conversely, once the protective action 125a-125h is initiated, the torque converter thermal management module 123 may sustain the respective protective action 125a-125h until the estimated torus temperature $119_{est}$ and/or the estimated clutch temperature $117_{est}$ drops below a corresponding protective action termination temperature for a threshold period of time.

Figure 3:
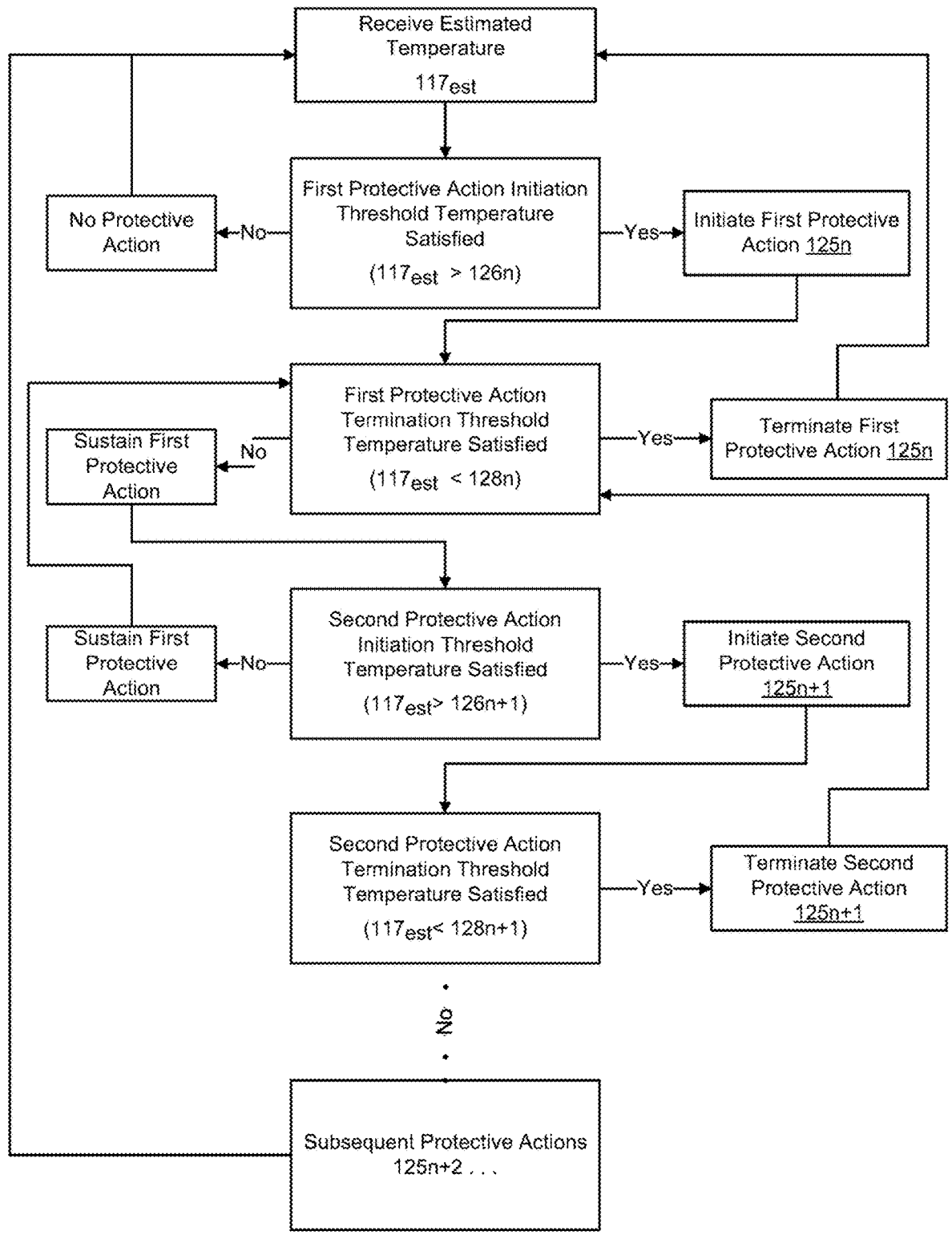
FIG. 3 is a flow chart showing example operations for initiating and terminating protective actions using the torque converter management system of FIG. 1.

With reference to FIG. 3, an abbreviated flow chart showing operations of the torque converter thermal management module 123 is provided. The operations shown in FIG. 3 are merely provided for the sake of explaining an example evaluation that the torque converter thermal management module 123 may execute with respect to the estimated clutch temperature 117est. Accordingly, the operations include determining protective actions with respect to a first "preceding" protective action 125n and a second "subsequent" protective action 125n+1 of a generic clutch protection schedule 124a. However, the operations associated with the "preceding" and "subsequent" protective actions 125n, 125n+1 would be followed for subsequent protective actions in the schedule, whereby the clutch protection schedule 124a may include additional protective actions. Additionally, FIG. 3 is provided merely as an illustrative example with respect to the clutch protection schedule 124a, but it should be understood that the torque converter thermal management module 123 would execute the same operations in evaluating the torus protection schedule 124b with respect to the estimated torus temperature 119est.

As shown in FIG. 3, the torque converter thermal management module 123 receives the estimated clutch temperature $117_{est}$ from the temperature evaluation module 121 and determines whether the estimated clutch temperature $117_{est}$ exceeds a first protective action initiation threshold temperature 126n. When the estimated clutch temperature $117_{est}$ does not exceed the first protective action initiation threshold temperature 126n, the torque converter thermal management module 123 does not initiate a protective action and returns to the first operation to receive a subsequent estimated clutch temperature $117_{est}$.

When the estimated clutch temperature $117_{est}$ does exceed the first protective action initiation threshold temperature 126n for the threshold period of time, the torque converter thermal management module 123 generates and transmits instructions to initiate the corresponding protective action 125n. Subsequently, the torque converter thermal management module 123 evaluates whether the estimated clutch temperature $117_{est}$ satisfies a corresponding protective action termination threshold temperature 128n (i.e., has the estimated clutch temperature $117_{est}$ dropped below a target cooling temperature 128n for a threshold period of time). When the preceding protective action termination threshold temperature 128n is satisfied (Yes), the torque converter thermal management module 123 terminates the preceding protective action 125n and continues monitoring subsequent estimated clutch temperatures $119_{est}$.

When the preceding protective action termination threshold temperature 128n is not satisfied (No), the torque converter thermal management module 123 sustains the preceding protective action 125n and proceeds to evaluate the estimated clutch temperature $117_{est}$ against the subsequent protective action initiation threshold temperature 126n+1. When the estimated clutch temperature $117_{est}$ does not exceed the subsequent protective action initiation threshold temperature 126n+1, the torque converter thermal management module 123 does not initiate a subsequent protective action 125n+1 and returns to the previous operation to determine whether the estimated clutch temperature $117_{est}$ satisfies the preceding protective action termination threshold temperature 128n.

When the estimated clutch temperature $117_{est}$ does exceed the second protective action initiation threshold temperature 126n+1, the torque converter thermal management module 123 generates and transmits instructions to initiate the subsequent protective action 125n+1. Subsequently, the torque converter thermal management module 123 evaluates whether the estimated clutch temperature $117_{est}$ satisfies a subsequent protective action termination threshold temperature 128n+1 (i.e., has the estimated clutch temperature $117_{est}$ dropped below a target cooling temperature 128n+1 for a threshold period of time). When the subsequent protective action termination threshold temperature 128n+1 is satisfied (Yes), the torque converter thermal management module 123 terminates the subsequent protective action 125n+1 and returns to the operation to determine whether the estimated clutch temperature $117_{est}$ satisfies the preceding protective action termination threshold temperature 1289n.

When the preceding protective action termination threshold temperature 128n is not satisfied (No), the torque converter thermal management module 123 sustains the preceding protective action 125n and the subsequent protective action 125n+1 and proceeds to further operations of the clutch protection schedule 124a with respect to evaluating the estimated clutch temperature $117_{est}$ with respect to escalated protective actions (e.g., 125n+2 and so on) of the clutch protection schedule 124a.

Referring to FIG. 4, an example of the clutch protection schedule 124a is provided and includes a plurality of clutch protective action initiation threshold temperatures 126a-126h and corresponding torque converter protective actions 125a-125h. FIG. 4 is provided for the sake of illustrating the schedule of torque converter protective actions 125a-125h in connection with the clutch 112. However, it should be understood that each of the torque converter protective actions 125a-125h would be evaluated according to the operations set forth in FIG. 3. In other words, initiation and termination of the torque converter protective actions 125a-125h would be executed by the torque converter thermal management module 123 based on corresponding protective action initiation and termination threshold temperatures 126a-126h, 127a-127d for each of the respective torque converter protective actions 125a-125h.

The torque converter protective actions 125a-125h are provided in an order from least intrusive to most intrusive with respect to the operation of the vehicle powertrain and/or drivetrain. In other words, as subsequent ones of the clutch protective action initiation threshold temperatures 126a-126h are exceeded, the torque converter thermal management module 123 initiates progressively more aggressive protective actions 125a-125h. Here, the term "intrusive" refers to the level to which normal vehicle operations may be modified to accommodate for the respective torque converter protective action, which may result in sacrificing performance or efficiency of vehicle operations.

Referring still to FIG. 4, when the torque converter thermal management module 123 determines that the estimated clutch temperature $117_{est}$ exceeds a first clutch threshold temperature 126a, the torque converter thermal management module 123 initiates a first torque converter protective action 125a and instructs the vehicle 10 to initiate stage one active thermal management to provide additional cooling capacity to the torque converter 110. For example, the torque converter thermal management module 123 sends stage one cooling instructions 125a to the vehicle thermal management system 400 to increase a cooling rate of the transmission fluid flowing from the torque converter 110 through the fluid cooler 150. In an illustrative example, the first clutch threshold temperature 126a may be 130° Celsius. When the estimated clutch temperature $117_{est}$ exceeds 130° Celsius for a threshold period of time, the torque converter thermal management module 123 sends stage one cooling instructions 125a to the vehicle thermal management system 400 to increase a cooling rate of the transmission fluid flowing from the torque converter through the fluid cooler 150 until a first protective action termination threshold temperature 128a (e.g., 120° Celsius) is satisfied (as discussed with respect to FIG. 3).

Referring still to FIG. 4, when the torque converter thermal management module 123 determines that the estimated clutch temperature $117_{est}$ exceeds a second clutch threshold temperature 126b, the torque converter thermal management module 123 instructs the vehicle 10 to initiate stage two active thermal management to provide additional cooling capacity to the torque converter 110. For example, the torque converter thermal management module 123 sends stage two cooling instructions 125b to the vehicle thermal management system 400 to maximize the cooling rate of the transmission fluid flowing from the torque converter 110 through the fluid cooler 150. In other words, in stage two cooling, the cooling demand of the torque converter 110 is at or exceeds the total cooling capacity of the fluid cooler 150. In an illustrative example, the second clutch threshold temperature 126b may be 140° Celsius. When the estimated clutch temperature $117_{est}$ exceeds 140° Celsius for a threshold period of time, the torque converter thermal management module 123 sends stage two cooling instructions 125b to the vehicle thermal management system 400 to maximize the cooling rate of the transmission fluid flowing from the torque converter through the fluid cooler 150 until a second protective action termination threshold temperature 128b (e.g., 130° Celsius) is satisfied (as discussed with respect to FIG. 3).

With continued reference to FIG. 4, when the torque converter thermal management module 123 determines that the estimated clutch temperature $117_{est}$ exceeds a third clutch threshold temperature 126c, the torque converter thermal management module 123 initiates a third torque converter protective action 125c and instructs the vehicle to initiate a pressure increase operation for the torque converter clutch 112. For example, when the clutch 112 operates in a high slip state, the clutch 112 may generate a relatively large amount of thermal energy as a result of friction between the clutch plate and the housing. By instructing the torque converter management system 100 to increase the pressure of the clutch 112, relative slip will be reduced, thereby reducing the amount of friction-related thermal energy generated by the clutch 112 within the torque converter 110 below the cooling capacity of the vehicle thermal management system 400 and the fluid cooler 150. This, in turn, allows the temperature of the torque converter fluid to decrease and cools the torque converter 110. The amount that the clutch pressure is increased may be a scalar determination based on the magnitude by which the estimated clutch temperature $117_{est}$ exceeds the third clutch threshold temperature 126c. In other words, a greater differential between the estimated clutch temperature $117_{est}$ and the third clutch threshold temperature 126c may correspond to a greater increase in clutch pressure. In an illustrative example, the third clutch threshold temperature 126c may be 130° Celsius (i.e., the same as the first clutch threshold temperature 126a). When the estimated clutch temperature $117_{est}$ exceeds 130° Celsius for a threshold period of time, the torque converter thermal management module 123 instructs the torque converter clutch control valve 130 to apply increased pressure at the torque converter clutch 112 to reduce clutch slip until a third protective action termination threshold temperature 128c (e.g., 125° Celsius) is satisfied (as discussed with respect to FIG. 3).

Referring still to FIG. 4, when the torque converter thermal management module 123 determines that either (i) the estimated clutch temperature $117_{est}$ exceeds a fourth clutch protective action initiation threshold temperature 126d and/or (ii) a torque converter energy output (calculated as a function of torque output and relative speeds of input and output shafts of the torque converter) exceeds a threshold torque converter energy, the torque converter thermal management module 123 initiates the fourth torque converter protective action 125d and instructs the vehicle 10 to terminate the current clutch slip profile. The clutch slip profile corresponds to a predetermined profile for managing torque converter slip during transient events, such as shifting gears. Thus, during steady-state operation, the torque converter controller 120 maintains a baseline slip condition targeting a steady state noise, vibration, and harshness (NVH) minimum viable slip for the current engine speed, load and gear state, which may result in zero or relatively little slip. However, the torque converter controller 120 may execute a slip profile associated with transient events, whereby slip is temporarily increased to accommodate the transient condition. Thus, at the fourth torque convert protective action 125d, the torque converter controller 120 terminates this slip profile and instructs the torque converter 110 to operate at the aforementioned baseline slip condition. This, in turn, allows the temperature of the torque converter 110 to cool in the manner previously discussed as relative friction at the clutch 112 is reduced or eliminated. In an illustrative example, the fourth clutch protective action initiation threshold temperature 126d may be 135° Celsius. When the estimated clutch temperature $117_{est}$ exceeds 135° Celsius for a threshold period of time, the torque converter thermal management module 123 instructs the torque converter clutch control valve 130 to apply increased pressure at the torque converter clutch 112 to minimize clutch slip until a fourth protective action termination threshold temperature 128d (e.g., 130° Celsius) is satisfied (as discussed with respect to FIG. 3).

With continued reference to FIG. 4, when the torque converter thermal management module 123 determines that the estimated clutch temperature $117_{est}$ exceeds a fifth protective action initiation threshold temperature 126e, the torque converter thermal management module 123 initiates the fifth torque converter protective action 125e and instructs the vehicle 10 to terminate cylinder deactivation mode. Generally, vehicles may be configured to slip the clutch 112 of the torque converter 110 at a higher rate when the vehicle engine is operating in a cylinder deactivation mode to mitigate potential vibrations and imbalances associated with the deactivation of cylinders. Thus, the fifth torque converter protective action 125e involves instructing the vehicle ECM 200 to operate the engine under normal conditions (i.e., no cylinders deactivated) so that the clutch 112 can be operated at a reduced slip rate. This reduced slip, in turn, allows the temperature of the torque converter 110 to cool in the manner previously discussed. In an illustrative example, the fifth protective action initiation threshold temperature 126e may be 140° Celsius. When the estimated clutch temperature $117_{est}$ exceeds 140° Celsius for a threshold period of time, the torque converter thermal management module 123 instructs the vehicle ECM 200 to terminate cylinder deactivation mode until a fifth protective action termination threshold temperature 128e (e.g., 135° Celsius) is satisfied (as discussed with respect to FIG. 3).

With continued reference to FIG. 4, when the torque converter thermal management module 123 determines that the estimated clutch temperature $117_{est}$ exceeds a sixth protective action initiation threshold temperature 126f, the torque converter thermal management module 123 initiates the sixth torque converter protective action 125f and initiates a vehicle "hot mode." In hot mode, the torque converter thermal management module 123 instructs the vehicle ECM 200 to down-shift the transmission into a lower gear (e.g., from fourth gear to third gear) so that the engine can operate at a higher speed (i.e., RPM) and the clutch 112 can be locked, thereby eliminating relative slip within the torque converter 110 and minimizing thermal energy generated associated with the corresponding friction. This, in turn, allows the temperature of the torque converter 110 to drop in the manner previously discussed. In an illustrative example, the sixth clutch threshold temperature 126f may be 145° Celsius. When the estimated clutch temperature $117_{est}$ exceeds 145° Celsius for a threshold period of time, the torque converter thermal management module 123 instructs the vehicle ECM 200 to initiate "hot mode" until a sixth protective action termination threshold temperature 128f (e.g., 140° Celsius) is satisfied (according to FIG. 3).

With continued reference to FIG. 4, when the torque converter thermal management module 123 determines that the estimated clutch temperature $117_{est}$ exceeds a seventh clutch protective action initiation threshold temperature 126g, the torque converter thermal management module 123 initiates the seventh torque converter protective action 125g and instructs the driver information console (DIC) 300 to display a notification regarding the torque converter 110 temperatures. The notification may instruct the vehicle operator to operate the vehicle engine in an idle state for a period of time to minimize slip and thermal energy at the torque converter 110 while providing increased transmission fluid flow through the torque converter 110 than what is provided when the clutch 112 is locked, thereby providing maximum cooling capability to the torque converter 110. This, in turn, allows the temperature of the torque converter 110 to decrease. In an illustrative example, the seventh clutch protective action initiation threshold temperature 126g may be 150° Celsius. When the estimated clutch temperature $117_{est}$ exceeds 150° Celsius for a threshold period of time, the torque converter thermal management module 123 instructs vehicle DIC 300 to display the notification until a seventh protective action termination threshold temperature 128g (e.g., 145° Celsius) is satisfied (according to FIG. 3).

Referring still to FIG. 4, when the torque converter thermal management module 123 determines that the estimated clutch temperature $117_{est}$ exceeds an eighth clutch protective action initiation threshold temperature 126h, the torque converter thermal management module 123 initiates the eighth torque converter protective action 125h and instructs the torque converter management system 100 to release or disengage the clutch 112 so that all torque is transmitted solely through the torus 116. The eighth clutch protective action initiation threshold temperature 126h may be particularly relevant in scenarios where the clutch cannot be locked (i.e., sixth torque converter protective action 125f) and/or the vehicle operator does not respond to the DIC notification (i.e., seventh torque converter protective action 125g). Releasing or disengaging the clutch 112 allows the temperature of the clutch 112 to decrease by eliminating friction within the torque converter 110 and facilitating an increased flow of the transmission fluid through the torque converter 110 to maximize cooling.

In some examples, the torque converter thermal management module 123 may evaluate the estimated torus temperature $119_{est}$ in determining whether to initiate the eighth torque converter protective action 125h. For example, where the estimated torus temperature $119_{est}$ also exceeds a predetermined threshold torus temperature (discussed below), the torque converter thermal management module 123 will not release the clutch 112, as doing so would shift the torque transmission burden solely to the torus 114, resulting in a temperature increase in the torus 114. In an illustrative example, the eighth clutch threshold temperature 126h may be 160° Celsius. When the estimated clutch temperature $117_{est}$ exceeds 160° Celsius for a threshold period of time (and the threshold torus temperature is not exceeded), the torque converter thermal management module 123 instructs the torque converter clutch control valve 130 to release the pressure applied to the clutch 112.

Referring to FIG. 5, an example the torus protection schedule 124b is provided and includes a plurality of torus protective action initiation threshold temperatures 127a-127d and corresponding torque converter protective actions 125a, 125b, 125f, 125g. FIG. 5 is provided for the sake of illustrating the schedule of torque converter protective actions 125a, 125b, 125f. 125g. However, it should be understood that each of the torque converter protective actions 125a. 125b, 125f, 125g would be evaluated according to the operations set forth in FIG. 3. In other words, initiation and termination of the torque converter protective actions 125a, 125b. 125f, 125g would be executed by the torque converter thermal management module 123 based on corresponding protective action initiation and termination threshold temperatures 127a, 127b, 127f, 127g, for each of the respective torque converter protective actions 125a, 125b, 125f, 125g.

In the illustrated example, the torque converter protective actions 125a. 125b, 125f. 125g utilized for the torus 114 are the same as the torque converter protective actions 125a, 125b, 125f, 125g previously described with respect to the clutch 112, and are provided in an order from least intrusive to most intrusive with respect to the operation of the vehicle powertrain and/or drivetrain. In other words, as subsequent ones of the torus protective action initiation threshold temperatures 127a-127d are exceeded, the torque converter thermal management module 123 initiates progressively more aggressive protective actions 125a. 125b, 125f, 125g. Here, the term "intrusive" refers to the level to which normal vehicle operations may be modified to accommodate for the respective torque converter protective action, which may result in sacrificing performance or efficiency of vehicle operations.

Referring still to FIG. 5, when the torque converter thermal management module 123 determines that the estimated torus temperature $119_{est}$ exceeds a first torus protective action initiation threshold temperature 127a, the torque converter thermal management module 123 initiates the first torque converter protective action 125a and instructs the vehicle 10 to initiate stage one active thermal management to provide additional cooling capacity to the torque converter 110. For example, the torque converter thermal management module 123 sends stage one cooling instructions 125a to the vehicle thermal management system 400 to increase a cooling rate of the transmission fluid flowing from the torque converter through the fluid cooler 150. In an illustrative example, the first torus protective action initiation threshold temperature 127a may be 130° Celsius. When the estimated torus temperature $119_{est}$ exceeds 130° Celsius for a threshold period of time, the torque converter thermal management module 123 sends stage one cooling instructions 125a to the vehicle thermal management system 400 to increase a cooling rate of the transmission fluid flowing from the torque converter 110 through the fluid cooler 150 until a first protective action termination threshold temperature 129a (e.g., 120° Celsius) is satisfied.

Referring still to FIG. 5, when the torque converter thermal management module 123 determines that the estimated torus temperature $119_{est}$ exceeds a second torus protective action initiation threshold temperature 127b, the torque converter thermal management module 123 initiates a second torque converter protective action 125b and instructs the vehicle to initiate stage two active thermal management to provide additional cooling capacity to the torque converter 110. For example, the torque converter thermal management module 123 sends stage two cooling instructions 125b to the vehicle thermal management system 400 to maximize the cooling rate of the transmission fluid flowing from the torque converter 110 through the fluid cooler 150. In other words, in stage two cooling, the cooling demand of the torque converter 110 is at or exceeds the total cooling capacity of the fluid cooler 150 and the torque converter thermal management module 123 may send instructions to the vehicle 10 that the torque converter 110 is operating in a degraded state. In an illustrative example, the second torus threshold temperature 119b may be 140° Celsius. When the estimated torus temperature $119_{est}$ exceeds 140° Celsius for a threshold period of time, the torque converter thermal management module 123 sends stage two cooling instructions 125b to the vehicle thermal management system 400 to maximize the cooling rate of the transmission fluid flowing from the torque converter 110 through the fluid cooler 150 until a second protective action termination threshold temperature 129b (e.g., 130° Celsius) is satisfied (according to FIG. 3).

With continued reference to FIG. 5, when the torque converter thermal management module 123 determines that the estimated torus temperature $119_{est}$ exceeds a third torus threshold temperature 127c, the torque converter thermal management module 123 initiates the sixth torque converter protective action 125f and initiates the vehicle "hot mode.". In hot mode, the torque converter thermal management module 123 instructs the vehicle ECM 200 to down-shift the transmission into a lower gear (e.g., from fourth gear to third gear) so that the engine can operate at a higher speed (i.e., RPM) and the clutch 112 can be locked, thereby eliminating relative slip within the torque converter 110 and minimizing thermal energy generated associated with the corresponding friction. This, in turn, allows the temperature of the torque converter 110 to cool in the manner previously discussed. In an illustrative example, the third torus threshold temperature 127c may be 150° Celsius. When the estimated torus temperature $119_{est}$ exceeds 150° Celsius for a threshold period of time, the torque converter thermal management module 123 instructs the vehicle ECM 200 to initiate "hot mode" until a third protective action termination threshold temperature 129c (e.g., 140° Celsius) is satisfied (according to FIG. 3).

With continued reference to FIG. 5, when the torque converter thermal management module 123 determines that the estimated torus temperature $119_{est}$ exceeds a fourth torus threshold temperature 127d, the torque converter thermal management module 123 initiates the seventh torque converter protective action 125g and instructs the driver information console (DIC) 300 to display the notification regarding the torque converter 110 temperatures. The notification may instruct the vehicle operator to operate the vehicle engine in an idle state for a period of time to minimize slip and thermal energy generated at the torque converter 110 while providing increased coolant (i.e., transmission fluid) flow through the torque converter 110 than what is provided when the clutch 112 is locked, thereby providing maximum cooling capability to the torque converter 110. This, in turn, allows the temperature of the torque converter 110 to decrease. In an illustrative example, the fourth torus protective action initiation threshold temperature 127d may be 165° Celsius. When the estimated torus temperature $119_{est}$ exceeds 165° Celsius for a threshold period of time, the torque converter thermal management module 123 instructs vehicle DIC 300 to display the notification until a fourth protective action termination threshold temperature 128d (e.g., 150) ° Celsius) is satisfied (according to FIG. 3).

The foregoing descriptions of the torque converter protection schedules 124a. 124b provide a representative illustration with respect to each of the clutch protection schedule 124a and the torus protection schedule 124b, including example temperatures that may be associated with each protection schedule 124a. 124b. However, it should be appreciated that one or more of the protective actions 125a-125h may be omitted from the protection schedules 124a. 124b depending on the configuration of the vehicle 10. For example, vehicles not equipped with cylinder deactivation mode would not include the fifth torque converter protective action 125e. Additionally, the temperature values provided for each of the threshold temperatures are merely example temperatures provided for the sake of illustrating the progressive or escalating nature of the protective actions 125a-125h. Thus, it should be appreciated that each subsequent protective action 125b-125h is generally initiated by the thermal management module 123 at an equal or greater estimated temperature $117_{est}$, $119_{est}$ than the preceding protective action 125a-125g. In some configurations, one or more of the protective actions 125a-125h may be initiated and executed concurrently, whereby each of the concurrent protective actions 125a-125h is associated with the same threshold temperature initiation and/or termination temperatures. Further, one or more of the protective actions 125a-125h may be terminated or interrupted based on initiation of a different one of the torque converter protective actions 125a-125h. For example, when the clutch 112 is released in association with the eighth torque converter protective action 125h, the torque converter protective actions 125c, 125d relating to increasing clutch pressure and terminating a current slip profile are interrupted. Thus, while the torque converter protective actions 125a-125h are illustrated as being initiated and terminated in the illustrated sequence, other configurations of the torque converter management system 100 may execute the torque converter protective actions 125a-125h in different sequences and/or omit, skip, or interrupt one or more of the torque converter protective actions 125a-125h.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A computer-implemented method that, when executed by data processing hardware of a vehicle having a torque converter, causes the data processing hardware to perform operations comprising:
    receiving a torque converter temperature associated with the torque converter;
    obtaining a torque converter protection schedule including a plurality of torque converter protective action initiation threshold temperatures each having a unique associated torque converter protective action;
    determining whether the torque converter temperature exceeds a first torque converter protective action initiation threshold temperature;
    when the torque converter temperature exceeds the first torque converter protective action initiation threshold temperature, initiating a first torque converter protective action associated with the exceeded first torque converter protective action initiation threshold temperature;
    determining whether the torque converter temperature exceeds a second one of the torque converter protective action initiation threshold temperatures that is greater than the first torque converter protective action initiation threshold temperature; and
    when the torque converter temperature exceeds the second one of the torque converter protective action initiation threshold temperatures, requesting a second torque converter protective action different than the first torque converter protective action.

2. The method of claim 1, wherein the first torque converter protective action includes at least one of (i) requesting increased cooling rate of the torque converter, (ii) adjustment of a clutch application pressure of a clutch of the torque converter, (iii) instructing an internal combustion engine of the vehicle to suspend a cylinder deactivation mode, (iv) instructing a transmission of the vehicle to operate in a different mode, (v) displaying a notification to a vehicle operator, (vi) releasing the clutch of the torque converter, or (vii) terminating a current clutch slip profile.

3. The method of claim 2, wherein the second torque converter protective action includes another of (i) requesting the increased cooling rate of the torque converter, (ii) adjustment of the clutch application pressure of the clutch of the torque converter, (iii) instructing the internal combustion engine of the vehicle to suspend the cylinder deactivation mode, (iv) instructing the transmission of the vehicle to operate in the different mode, (v) displaying the notification to the vehicle operator, (vi) releasing the clutch of the torque converter, or (vii) terminating the current clutch slip profile.

4. The method of claim 1, further comprising determining the torque converter temperature based on at least one of a measured torque converter temperature or a modeled torque converter temperature.

5. The method of claim 1, wherein the torque converter temperature is a clutch temperature.

6. The method of claim 1, wherein the torque converter temperature is a torus temperature.

7. A system comprising:
    a torque converter including a clutch and a torus;
    data processing hardware; and
    memory hardware in communication with the data processing hardware, the memory hardware storing instructions that when executed on the data processing hardware cause the data processing hardware to perform operations comprising:
        receiving a torque converter temperature associated with the torque converter;
        obtaining a torque converter protection schedule including a plurality of torque converter protective action initiation threshold temperatures each having a unique associated torque converter protective action;
        determining whether the torque converter temperature exceeds a first torque converter protective action initiation threshold temperature; and
        when the torque converter temperature exceeds the first torque converter protective action initiation threshold temperature, initiating a first torque converter protective action associated with the exceeded first torque converter protective action initiation threshold temperature.

8. The system of claim 7, wherein the operations further comprise:
    determining whether the torque converter temperature exceeds a second one of the torque converter protective action initiation threshold temperatures; and
    when the torque converter temperature exceeds the second one of the torque converter protective action initiation threshold temperatures, requesting a second torque converter protective action different than the first torque converter protective action.

9. The system of claim 8, wherein the first torque converter protective action includes at least one of (i) requesting an increased cooling rate of the torque converter, (ii) adjustment of a clutch application pressure of a clutch of the torque converter, (iii) instructing an internal combustion engine of a vehicle to suspend a cylinder deactivation mode, (iv) instructing a transmission of the vehicle to operate in a different mode, (v) displaying a notification to a vehicle operator, (vi) releasing the clutch of the torque converter, or (vii) terminating a current clutch slip profile.

10. The system of claim 9, wherein the second torque converter protective action includes another of (i) requesting the increased cooling rate of the torque converter, (ii) adjustment of the clutch application pressure of the clutch of the torque converter, (iii) instructing the internal combustion engine of the vehicle to suspend the cylinder deactivation mode, (iv) instructing the transmission of the vehicle to operate in the different mode, (v) displaying the notification to the vehicle operator, (vi) releasing the clutch of the torque converter, or (vii) terminating the current clutch slip profile.

11. The system of claim 7, further comprising determining the torque converter temperature based on at least one of a measured torque converter temperature and a modeled torque converter temperature.

12. The system of claim 7, wherein the torque converter temperature is a clutch temperature.

13. The system of claim 7, wherein the torque converter temperature is a torus temperature.

14. A computer program product encoded on a non-transitory computer readable storage medium comprising instructions that when executed by a data processing apparatus cause the data processing apparatus to perform operations comprising:
receiving a torque converter temperature associated with a torque converter;
obtaining a torque converter protection schedule including a plurality torque converter protective action initiation threshold temperatures each having a unique associated torque converter protective action;
determining whether the torque converter temperature exceeds a first torque converter protective action initiation threshold temperature;
when the torque converter temperature exceeds the first torque converter protective action initiation threshold temperature, initiating a first torque converter protective action associated with the exceeded first torque converter protective action initiation threshold temperature;
determining whether the torque converter temperature exceeds a second one of the torque converter protective action initiation threshold temperatures greater than the first torque converter protective action initiation threshold temperature; and
when the torque converter temperature exceeds the second one of the torque converter protective action initiation threshold temperatures, (i) sustaining the first torque converter protective action, and (ii) requesting a second torque converter protective action different than the first torque converter protective action.

15. The product of claim 14, wherein the first torque converter protective action includes at least one of (i) requesting an increased cooling rate of the torque converter, (ii) adjustment of a clutch application pressure of a clutch of the torque converter, (iii) instructing an internal combustion engine of a vehicle to suspend a cylinder deactivation mode, (iv) instructing a transmission of the vehicle to operate in a different mode, (v) displaying a notification to a vehicle operator, (vi) releasing the clutch of the torque converter, or (vii) terminating a current clutch slip profile.

16. The product of claim 15, wherein the second torque converter protective action includes another of (i) requesting the increased cooling rate of the torque converter, (ii) adjustment of the clutch application pressure of the clutch of the torque converter, (iii) instructing the internal combustion engine of the vehicle to suspend the cylinder deactivation mode, (iv) instructing the transmission of the vehicle to operate in the different mode, (v) displaying the notification to the vehicle operator, (vi) releasing the clutch of the torque converter, or (vii) terminating the current clutch slip profile.

17. The product of claim 14, further comprising determining the torque converter temperature based on at least one of a measured torque converter temperature or a modeled torque converter temperature.

18. The product of claim 14, wherein the torque converter temperature is at least one of a clutch temperature or a torus temperature.

* * * * *